United States Patent Office 2,870,887
Patented Jan. 27, 1959

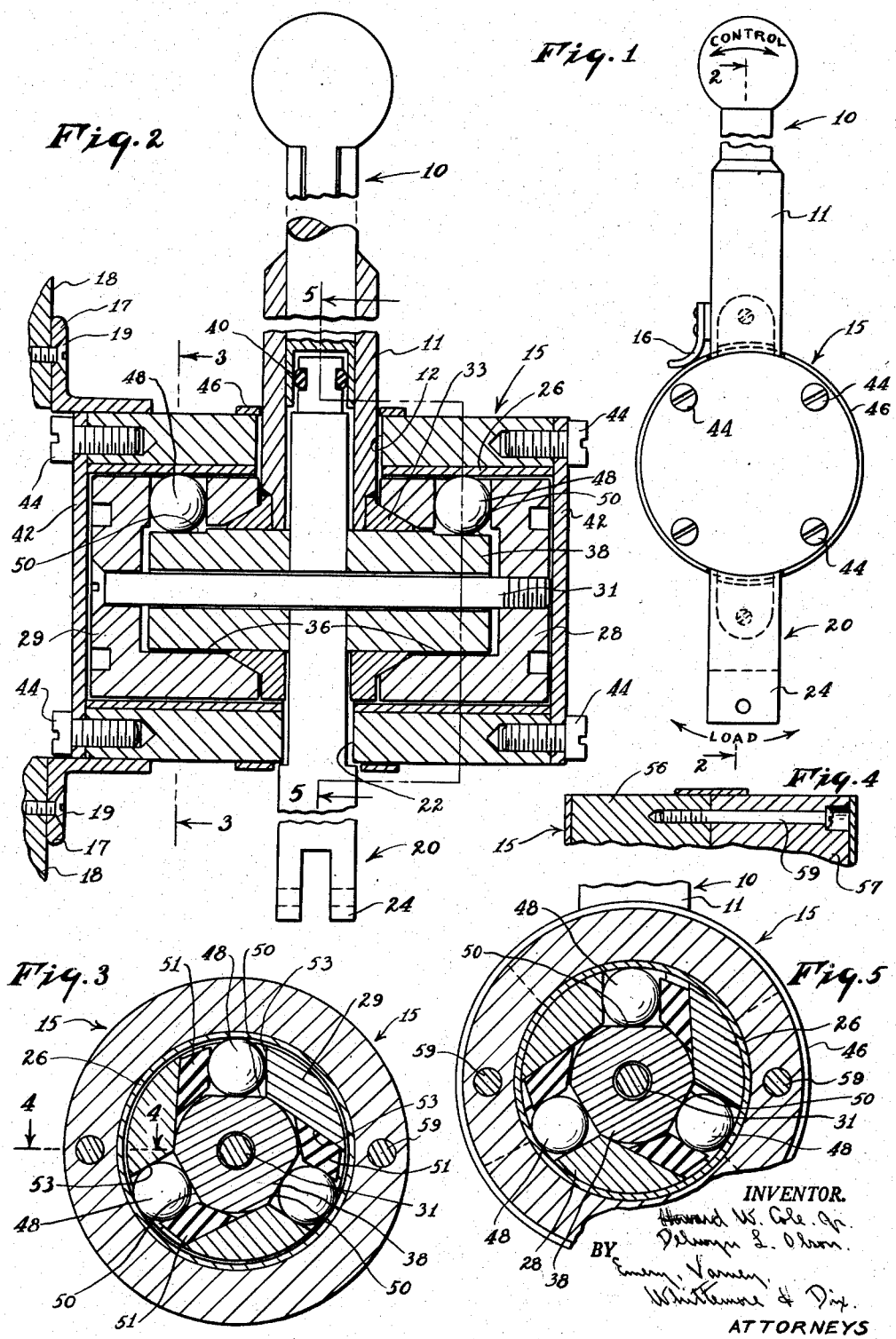

2,870,887

TWO-WAY AUTOMATIC LOCKING ACTUATORS

Howard W. Cole, Jr., Mountain Lakes, and Delwyn L. Olson, Lake Mohawk, N. J.

Application April 12, 1954, Serial No. 422,541

9 Claims. (Cl. 192—8)

This invention relates to controls or actuators for imparting movement of one element to another; and the invention relates more especially to actuators in which it is desirable to transmit motion from a primary to a secondary element through a connection which will not permit the secondary element to transmit motion to the primary element. The secondary element is thus locked automatically in any position to which it is moved by the primary element.

Such an actuator has numerous applications to mechanical controls. For example, the primary element may be a manually actuated lever and the secondary element may be connected with a flap of an airplane. With this invention the flap can be raised or lowered by pushing the primary element one way or the other, and the flap will remain in any set position because forces acting on the flap cannot transmit motion back to the primary element. Another application is in the case of steering mechanism for an automobile or other vehicle. It is desirable to have an operator transmit motion from a steering wheel to the road wheels, but the mechanism should not transmit road shock and other forces back to the steering wheel.

There are numerous other cases where it is desirable to transmit force from a manually operated element, or from a power operated element, to a load-connected actuator which is intended to remain in any position to which it may have been moved and until the primary actuator is again operated to change its position.

It is an object of this invention to provide an improved actuator through which motion can be transmitted in different directions from a primary element to a secondary element, and in which the secondary element cannot transmit motion back to the primary element. The invention will be described as applied to levers which oscillate about a common axis through predetermined angles of movement, but it will be understood that the invention can be applied also to a construction in which the motion is transmitted from a lever to a shaft, or from one shaft to another, or from one straight-line reciprocating element to another.

In its preferred embodiment, the invention comprises two overrunning clutches which are faced in opposite directions and these clutches are connected with the secondary lever so that one or the other of the clutches will wedge against a stationary housing to prevent motion of the secondary lever in either direction. The primary lever is connected with cages that hold the wedging elements of the overrunning clutches and movement of the cages advances the clutch elements to prevent them from wedging. The primary lever is connected to the clutches so that it moves the clutch elements on the clutch which would otherwise engage, the other clutch being turned in such a direction that it would move freely anyway. When the primary lever is moved in the opposite direction, it moves the elements of the other clutch to prevent them from wedging, the first clutch being free to turn in that direction.

One feature of the invention relates to resilient means for holding the clutch elements in position for immediate wedging action upon initiation of the movement of the secondary element in either direction. This causes the invention to lock the secondary element against all motion so that there is no vibration or chattering when the invention is used under conditions which apply a variable or reversing load to the secondary element.

Other objects, features and advantages of the invention will appear or be pointed out as the description proceeds.

In the drawing, forming a part hereof, in which like reference characters indicate corresponding parts in all the views:

Figure 1 is a side elevation of an actuator made in accordance with this invention;

Figure 2 is an enlarged, sectional view taken on the line 2—2 of Figure 1;

Figure 3 is a sectional view taken on the line 3—3 of Figure 2;

Figure 4 is a sectional view taken on the line 4—4 of Figure 3; and

Figure 5 is a sectional view taken on the offset section line 5—5 of Figure 2.

The invention includes a primary element, illustrated as a lever 10, which serves as the operating element for transmitting motion to a load. The lower portion of the primary lever includes a tube 11 which extends through a slot 12 in the upper wall of a housing 15. A spring 16 is connected to the lever 10 and bears against the outside of the apparatus. This spring 16 serves as a friction brake to prevent the lever 10 from moving as the result of vibration of the aircraft or other apparatus with which the actuator is used.

In the construction illustrated, the housing 15 is the supporting portion of the actuator and is also the stationary part; there being brackets 17 by which the housing 15 is connected to a stationary support 18, such as a bulk head or wall. The brackets 17 are connected to the wall 18 by screws 19.

A secondary element or lever 20 extends through a slot 22 in the lower wall of the housing 15, and this secondary lever 20 is the operated element of the actuator and has a bifurcated lower end 24 for connection to a reach rod or other connection to a load which is to be moved by the actuator.

Within the housing 15 there is a cylindrical chamber having its inside wall covered by a liner 26. This liner 26 is to be considered part of the housing 15 and the liner provides an inside surface of the housing and a bearing for ball cages 28 and 29. These ball cages are connected together by a bolt 31 and they are free to oscillate in the housing 15 about the axis of the chamber in which they are located. The primary lever 10 is connected to the ball cages 28 and 29 by a collar 33. In the construction illustrated, the primary lever 10 and the ball cages 28 and 29 oscillate as a unit.

There are confronting recesses 36 in the ball cages 28 and 29, and a cam element 38 fits into these recesses 36 and is movable in these recesses, about the axis of the cylindrical chamber, with the recesses 36 serving as the supporting bearings for the cam element 38. The secondary lever 20 extends through an opening in the cam element 38, and extends upwardly into the lower portion of the primary lever 10. The cam element 38 is made as a sleeve so as to provide clearance through which the bolt 31 extends. The secondary lever 20 has an opening for the bolt 31, and the cam element 38 is rigidly connected to the secondary lever 20 so that the cam element and the secondary lever oscillate as a unit.

The portion of the secondary lever 20, which extends into the hollow lower end of the primary lever 10, is of smaller diameter than the inside diameter of the primary lever 10 so as to provide a clearance which gives the primary lever a certain amount of independent movement before it imparts movement to the secondary lever 20. Thus there is a lost motion connection between the primary lever 10 and the secondary lever 20, though in actual practice it has been found sufficient to have only a few thousandths of an inch of clearance for this lost motion. Its purpose is to enable the primary lever 10 to move far enough to unlock either of the clutches, which may be locked, before the primary lever 10 has to displace the secondary lever 20. Resilient means are provided for holding the secondary lever 20 in the center of the clearance in the primary lever; and in the construction illustrated, the resilient means consists of a rubber O-ring 40.

The ends of the cylindrical chamber of the housing 15 are closed by covers 42 attached to the ends of the housing 15 by screws 44. The slots 12 and 22 in the upper and lower ends of the housing 15 are covered by a cylindrical dust cover 46 which extends around the circumference of the housing 15 and which oscillates with the levers 10 and 20. There is a small amount of clearance around the secondary lever 20 so that the cover 46 can begin its oscillating movement with the primary lever 10 and move a few degrees before the secondary lever 20 begins to move. This is necessary because of the lost motion connection between the primary lever 10 and the secondary lever 20.

There are angularly spaced openings in the ball cages 28 and 29 for holding balls 48 which substantially fill the space between the cam element 38 and the inside face of the housing 15. This inside face of the housing serves as a raceway for the balls 48. There are cam faces 50, on the cam element 38, for wedging the balls 48 against the face of the housing 15 to engage the clutches. The housing 15 is an outer clutch member; the cam element 38 an inner clutch member; and the balls 48 the clutch elements which are engaged by being wedged between the inner and outer members of the clutch. Since the housing 15 is attached to a stationary support, and therefore cannot rotate, the engaging of the clutch prevents rotation of the cam element 38.

Within the ball-holding openings in the ball cage 29, there are resilient means, here shown as small rubber blocks 51 for holding the balls 48 against end walls 53 of the openings in which the balls 48 are held. These resilient blocks 51 hold the balls 48 in position to be wedged against the inside face of the housing 15 upon initiation of rotary movement of the cam element 38; and by holding the balls 48 against the end faces 53 of the ball cage, the balls 48 are advanced immediately upon any rotation of the ball cage 29 in a counter clockwise direction in Figure 3.

This construction, shown in Figure 3, is an overrunning clutch which engages when the cam element 38 starts to turn in a counter clockwise direction. It would also engage if the housing 15 started to turn in a clockwise direction, but this is not possible in the illustrated construction, as previously explained. If the ball cage 29 rotates in a counter clockwise direction, it moves the balls 48, against the pressure of the resilient blocks 51, into a position in which there is an increased clearance between the faces on the cam element 38 and the liner 26 on the inside face of the housing 15, and the ball cage 28 and cam element 38 can then rotate as a unit without wedging of the balls 48. The face 53 of the ball cage serves to keep the balls 48 advancing as fast as the cam surfaces on the cam element 38 so that during this counter clockwise rotation the cam surfaces never move into position, with respect to the balls 48, to wedge the balls against the inside face of the housing 15.

Figure 4 shows the way in which the housing 15 is made up of two different sections 56 and 57 connected together by a screw 59. This is a more economical construction than a one piece housing in which the slots for the operating levers would have to be cut. There is a similar screw 59 on the opposite side of the housing 15.

Figure 5 shows the construction of the ball cage 28. This construction is similar to that already described in Figure 3, except that the parts are arranged so that the clutch engages when the cam element 38 turns in the opposite direction to that which engages or wedges the balls 48 in the ball cage 29 of Figure 3. The reason for having these two overrunning clutches facing in opposite directions, as previously explained, is to provide a firm holding action to prevent the cam element 38 from rotating in either direction. By having the balls 48 substantially fill the clearance between the inside wall of the housing 15, and the point on the cam face of the element 38 with which the balls 48 contact, wedging action occurs immediately upon inauguration of any rotary movement of the cam element 38.

The balls 48 are located at equal angular spacing around the axis of the chamber in the housing, that is, at each one hundred twenty degrees of the circumference; and these equally spaced balls provide a self compensating feature which makes unnecessary close manufacturing tolerances, because if one ball wedges, the other two must also wedge simultaneously in the construction illustrated.

Although the invention has been illustrated with balls as the clutch elements, it will be understood that rollers can be used instead; and that the construction can be modified so as to obtain three hundred and sixty degrees of revolution of the primary and secondary elements, it being merely necessary to locate these elements at opposite ends of the fixed housing instead of having them extend through slots in the housing.

Other changes and modifications can be made, and some features of the invention can be used in different combinations, without departing from the invention as defined in the claims.

We claim as our invention:

1. A motion-transmitting device including a controller, a load connected element operated by the controller, two overrunning clutches axially spaced from one another and facing in opposite directions circumferentially and each including an outer clutch member comprising a housing, an inner clutch member within the housing, a plurality of clutch elements between the outer and inner clutch members of each clutch, one of the clutch members of each clutch being stationary, and the other clutch member of each clutch having cam faces thereon for wedging the clutch elements against the fixed member when the cam faces are moved in one direction, the clutch member with the cam faces being rigidly connected with the load carrying element, and means connected with the controller for moving the clutch elements of the respective clutches as a unit with their associated cam faces and without wedging either of the clutches.

2. An actuator comprising a stationary housing having an inside surface at least a portion of which is round, cam means within the housing and rotatable about the axis of the round portion of said surface, two groups of clutch elements confined between the cam means and said inside surface and spaced from one another along said axis, the cam means having cam faces in positions to wedge the clutch elements of one group against the round surface of the stationary housing to prevent movement of said cam means when the cam means start to turn in one direction, other cam faces on the cam means oriented to wedge the clutch elements of the other group against the surface of the housing when the cam means start to turn in the opposite direction, cage means that hold the clutch elements, a load actuator, a rigid connection between the load actuator and the cam means whereby the load actuator and the cam means move as a unit and movement of the load actuator with respect to the cam means is prevented, and a primary control element connected to the cage and also connected to the load actuator.

3. A motion-transmitting device including a controller, a load connected element operated by the controller, two overrunning clutches axially spaced from one another and facing in opposite directions circumferentially and each including an outer clutch member comprising a housing with a cylindrical raceway therein, an inner clutch member within the housing, at least three clutch elements located between the clutch members of each clutch at angularly spaced locations around an axis, and in position to travel around the raceway, one of the clutch members of each clutch being stationary, and the other clutch member of each clutch having cam faces thereon in position to wedge the clutch elements against the stationary clutch member when the member having the cam faces thereon is rotated in one direction, resilient means holding the clutch elements in contact with both clutch members simultaneously and in position to wedge instantly upon initiation of movement of the cam faces, a rigid connection between the load connected element and the clutch member having the cam faces thereon for preventing play or other movement of the load-connected element with respect to the cam faces, and a connection operated by movement of the controller for preventing wedging of the cam elements.

4. Control means comprising an operating element and an operated element connected with one another, two overrunning clutches axially spaced from one another and facing in opposite directions circumferentially and each of which has an outer clutch member comprising a housing having a cylindrical raceway therein, an inner clutch member located within the housing, clutch elements that travel around the raceway between the inner and outer clutch members, cam faces on one of the clutch members movable in one direction with respect to the cam elements for wedging the clutch elements against the other clutch member, a rigid connection between the operated element and the clutch member having the cam faces thereon, and a connection holding said other clutch elements stationary so that wedging of the clutch elements of one clutch prevents movement of the operated element in one direction and wedging of the clutch elements of the other clutch prevents movement of the operated element in the other direction, and means connected to the operating element for moving the clutch elements and the cam faces simultaneously and in the same direction to prevent engagement of the overrunning clutches.

5. The control means described in claim 4, with a brake for preventing motion of the operating element as a result of vibration of the apparatus with which the control means is intended to be used.

6. An actuator comprising a primary arm for operation as a controller, a secondary arm operably connected to the preliminary arm and adapted to be connected with a load, a clutch member connected to the secondary arm, another clutch member connected to a fixed support, two sets of clutch elements axially spaced from one another and located between the clutch members, and each set including elements located at angularly spaced regions around an axis, cam faces on one of the clutch members in position to wedge the clutch elements of one set against the other clutch member when the cam faces are moved angularly in one direction, other cam faces on the same clutch member with the first cam faces, but oriented to wedge the clutch elements against the other clutch member when the cam faces are moved angularly in the opposite direction, a rigid connection between the secondary arm and the clutch member having the cam faces thereon, and operating mechanism within the clutch, connected to the primary arm, and movable to shift the clutch elements in directions to prevent their wedging action when the primary and secondary arms are operated by force applied to the primary arm.

7. The actuator described in claim 6 and in which the primary and secondary arms are connected with one another through a lost motion connection, and in which there are resilient means in the lost motion connection for holding the lost motion connection in a mid position when no force is being applied to operate the first arm.

8. An actuator comprising a housing with means for connecting it to a stationary support, a cylindrical chamber within the housing, angularly extending slots through the upper and lower walls of the housing, a control lever extending through the slot in the upper wall of the housing, a second lever extending through the slot in the lower wall of the housing for connection to a load, means connecting the levers for oscillation about an axis substantially coincident with the longitudinal axis of the cylindrical chamber within the housing, an inner clutch member rigidly connected to the second lever and located within the chamber, two groups of clutch elements comprising round members located at angularly spaced regions around the axis of the chamber and between the inner clutch member and the inside wall of the chamber which serves as a raceway on which the round members roll, the two groups of round members being spaced from one another along the axis of the chamber, cam faces on the clutch member for wedging the round members of one group against the wall of the chamber when the clutch member is rotated in one direction, and other cam faces on the clutch member oriented to wedge the round members of the other set against the wall of the chamber when the clutch member is rotated in the opposite direction, and motion-transmitting connections between the first lever and the clutch elements for pushing the clutch elements angularly ahead of the cam faces to prevent the cam faces from wedging the clutch elements against the inside face of the chamber.

9. An actuator comprising a cylindrical housing having means for connecting it with a stationary support, the housing having a cylindrical chamber therein which serves as a bearing, two cages for the round members located within the housing and rotatable in the housing as a bearing, a primary arm extending between the cages and to which the cages are connected for oscillation with the arm about the longitudinal axis of the chamber, a cam element located within the cages and spaced from the inside face of the chamber and rotatable in the cages as bearings and about said axis of the chamber, a secondary arm rigidly connected to the cam member and located in substantial alignment with the primary arm and having a portion extending upwardly into a hollow interior of the primary arm with some clearance between the inside of the primary arm and the outside surface of the portion of the secondary arm which extends into the primary arm, resilient means holding the secondary arm substantially centered in said clearance, round members carried by the cages and substantially filling the space between the cam element and the inside wall of the chamber, cam faces on the cam element including one group of faces adjacent to certain of the round members for wedging those round members against the inside face of the chamber when the cam element is rotated in one direction, other cam faces on the cam element in position to wedge other round members against the surface of the chamber when the cam element is rotated in the other direction, means within the cages urging the round members into position to wedge promptly upon initiation of movement of the cam faces with which those round members contact.

(References on following page)

References Cited in the file of this patent

UNITED STATES PATENTS

| | | |
|---|---|---|
| 275,388 | Huyck | Apr. 10, 1883 |
| 1,385,785 | Hoter et al. | July 26, 1921 |
| 1,471,398 | Inglis | Oct. 23, 1923 |
| 1,944,116 | Stratman | Jan. 16, 1934 |
| 2,240,932 | Kinser | May 6, 1941 |
| 2,300,022 | Swartz | Oct. 27, 1942 |
| 2,583,428 | Houplain | Jan. 22, 1952 |
| 2,660,902 | Wagner | Dec. 1, 1953 |

FOREIGN PATENTS

| | | |
|---|---|---|
| 797,525 | France | Feb. 17, 1936 |
| 573,005 | Great Britain | Nov. 1, 1945 |